United States Patent
Suzuki et al.

(10) Patent No.: US 11,970,587 B2
(45) Date of Patent: Apr. 30, 2024

(54) COVERING MATERIAL, CABLE, AND METHOD OF MANUFACTURING CABLE

(71) Applicant: PROTERIAL, LTD., Tokyo (JP)

(72) Inventors: Hideyuki Suzuki, Tokyo (JP); Sohei Kodama, Tokyo (JP)

(73) Assignee: Proterial, Ltd., Tokyo (JP)

(*) Notice: Subject to any disclaimer, the term of this patent is extended or adjusted under 35 U.S.C. 154(b) by 287 days.

(21) Appl. No.: 16/155,952

(22) Filed: Oct. 10, 2018

(65) Prior Publication Data

US 2019/0169378 A1   Jun. 6, 2019

(30) Foreign Application Priority Data

Dec. 4, 2017 (JP) .................. 2017-232812

(51) Int. Cl.
  *C08J 3/24* (2006.01)
  *B29C 48/00* (2019.01)
  (Continued)

(52) U.S. Cl.
  CPC ............... *C08J 3/24* (2013.01); *B29C 48/022* (2019.02); *B29C 48/154* (2019.02); *C08J 3/243* (2013.01);
  (Continued)

(58) Field of Classification Search
  CPC ... H01B 3/00; H01B 3/40; H01B 3/44; H01B 3/441–448; H01B 3/42; C08J 3/24;
  (Continued)

(56) References Cited

U.S. PATENT DOCUMENTS 5,514,729 A * 5/1996 Diamant .................. H01B 1/22
                                                252/501.1
2008/0045619 A1 * 2/2008 Jackson .................. C08L 23/10
                                                522/66
(Continued)

FOREIGN PATENT DOCUMENTS

CN    102702442    10/2012
JP    H05501734 A   4/1993
(Continued)

OTHER PUBLICATIONS

Notice of Reasons for Refusal dated Mar. 16, 2021 in the related Japanese patent application No. 2017-232812 and its English translation.
(Continued)

*Primary Examiner* — Matthew D Matzek
(74) *Attorney, Agent, or Firm* — Meunier Carlin & Curfman LLC (57) ABSTRACT

A covering material includes: a resin component containing at least one of a crosslinkable resin having photo crosslinkability and thermal crosslinkability and a crosslinkable monomer having photo crosslinkability and thermal crosslinkability; a photoinitiator; and a thermal initiator. A cable includes a core and the covering material that covers the core. A method of manufacturing a cable includes covering a core with a covering material and crosslinking the covering material, wherein the covering material includes: a resin component containing at least one of a crosslinkable resin having photo crosslinkability and thermal crosslinkability and a crosslinkable monomer having photo crosslinkability and thermal crosslinkability; a photoinitiator; and a thermal initiator.

12 Claims, 2 Drawing Sheets

(51) Int. Cl.
  *B29C 48/154* (2019.01)
  *C08J 7/12* (2006.01)
  *C08L 23/06* (2006.01)
  *C08L 23/08* (2006.01)
  *H01B 3/42* (2006.01)
  *B29K 23/00* (2006.01)
  *B29K 105/00* (2006.01)
  *B29L 11/00* (2006.01)
  *B29L 31/34* (2006.01)

(52) U.S. Cl.
  CPC ............... *C08J 7/123* (2013.01); *C08L 23/06* (2013.01); *C08L 23/0815* (2013.01); *C08L 23/0853* (2013.01); *H01B 3/42* (2013.01); *B29K 2023/0625* (2013.01); *B29K 2023/083* (2013.01); *B29K 2105/0026* (2013.01); *B29K 2105/0032* (2013.01); *B29L 2011/0075* (2013.01); *B29L 2031/3462* (2013.01); *C08J 2323/06* (2013.01); *C08J 2323/08* (2013.01); *C08J 2423/08* (2013.01); *C08J 2423/26* (2013.01); *C08J 2433/14* (2013.01); *C08L 2203/202* (2013.01); *C08L 2205/025* (2013.01); *C08L 2205/03* (2013.01); *C08L 2207/066* (2013.01); *C08L 2312/00* (2013.01)

(58) Field of Classification Search
  CPC ........ C08J 3/243; C08J 7/123; C08J 2323/06; C08J 2323/08; C08J 2423/08; C08J 2423/26; C08J 2433/14; B29C 48/022; B29C 48/154; B29C 48/06; B29C 48/91; C08L 23/06; C08L 23/0815; C08L 23/0853; C08L 2203/202; C08L 2205/025; C08L 2205/03; C08L 2207/066; C08L 2312/00; B29K 2023/0625; B29K 2023/083; B29K 2105/0026; B29K 2105/0032; B29L 2011/0075; B29L 2031/3462

USPC ........................... 428/375; 174/110 R, 137 R
See application file for complete search history.

(56) References Cited

U.S. PATENT DOCUMENTS

| | | | |
|---|---|---|---|
| 2010/0222446 A1* | 9/2010 | Tamai | C08F 8/00 522/24 |
| 2010/0307822 A1* | 12/2010 | Schmidt | H01B 7/295 174/74 R |
| 2019/0330464 A1* | 10/2019 | Ushiyama | C08G 59/5046 |

FOREIGN PATENT DOCUMENTS

| | | |
|---|---|---|
| JP | H07268065 A | 10/1995 |
| JP | 2009218035 A | 9/2009 |
| JP | 2015004040 A | 1/2015 |
| WO | 9201015 A1 | 1/1992 |

OTHER PUBLICATIONS

Notice of Reasons for Refusal received in connection with Japanese Patent Application No. 2017-232812 dated Aug. 26, 2021, 8 pages.
Kamon, Takashi, The Curing Reaction of Epoxy Resins, The Kyoto Municipal Institute for Industry, vol. 1, No. 3, pp. 167-181, 1980.
Office Action dated Jan. 30, 2022 issued in related Chinese patent application No. 201810880255.X and its English translation.
Decision of Refusal issued on Dec. 14, 2022, in Chinese Patent Application No. 201810880255.X.
Ki et al. "Free Radicals Polymerization Reaction." Introduction to Materials Chemistry, 3rd Edition, 188-191, Harbin Institute of Technology Press. 2017.
Xie, Wangfu et al. "Study on its UV-Curing Properties with a Novel Reactive Diluent in a Radical/Cationic Hybrid System." Fine Petrochemicals, vol. 33, No. 3 (2016).
Office Action issued in Chinese Patent Application No. 201810880255.X dated Aug. 25, 2022 and English translation with cited "common knowledge" document attached.

* cited by examiner

FIG. 1

FIG. 2

COVERING MATERIAL, CABLE, AND METHOD OF MANUFACTURING CABLE

CROSS-REFERENCE TO RELATED APPLICATIONS

This application claims the benefit of Japanese Patent Application No. 2017-232812 filed on Dec. 4, 2017 in the Japan Patent Office, the entire disclosure of which is incorporated herein by reference.

BACKGROUND

The present disclosure relates to a covering material, a cable, and a method of manufacturing the cable.

Cables with a core and a covering material for covering the core are known. The covering material is extruded by an extruder and covers the core. To improve heat resistance of the cable, crosslinking of the covering material is widely used. Methods of crosslinking the covering material include, for example, electron beam irradiation crosslinking, organic peroxide crosslinking and silane-water crosslinking. CN102702442A (Patent Document 1) discloses a method of crosslinking by a combination of a modified polymer, a polyfunctional monomer, and a photoinitiator.

SUMMARY

In electron beam irradiation crosslinking and the technique disclosed in Patent Document 1, electron beam or light may sometimes fail to reach inside the covering material, for example, when the covering material is thick or colored. In this case, crosslinking may be insufficient inside the covering material.

The techniques of organic peroxide crosslinking and silane-water crosslinking require a long time for crosslinking. In the technique of organic peroxide crosslinking, when the amount of organic peroxide is excessively increased, scorch or burning occurs due to premature crosslinking in an extruder. Also in the technique of silane-water crosslinking, when the amount of a silane compound or a catalyst is excessively increased, premature crosslinking occurs.

Aspects of the present disclosure preferably provide a covering material capable of promoting crosslinking inside the covering material and inhibiting premature crosslinking, a cable, and a method of manufacturing a cable.

A first aspect of the present disclosure provides a covering material comprising a resin component that comprises at least one of a crosslinkable resin having photo crosslinkability and thermal crosslinkability and a crosslinkable monomer having photo crosslinkability and thermal crosslinkability, a photoinitiator, and a thermal initiator.

The covering material of the first aspect of the present disclosure comprises the photoinitiator in addition to the thermal initiator. Therefore, the covering material of the first aspect of the present disclosure can reduce the blending amount of the thermal initiator compared to a case where only the thermal initiator is contained as an initiator. As a result, according to the present disclosure, it is possible to inhibit premature crosslinking of the covering material.

The covering material of the first aspect of the present disclosure comprises the thermal initiator in addition to the photoinitiator. Therefore, it is possible to promote crosslinking inside the covering material, for example, even when the covering material is thick or colored.

A second aspect of the present disclosure provides a cable comprising a core and the covering material of the first aspect of the present disclosure that covers the core.

The covering material included in the cable of the second aspect of the present disclosure comprises the photoinitiator in addition to the thermal initiator. Therefore, the covering material of the first aspect of the present disclosure can reduce the blending amount of the thermal initiator compared to the case where only the thermal initiator is contained as an initiator. As a result, according to the present disclosure, it is possible to inhibit premature crosslinking of the covering material.

The covering material included in the cable of the second aspect of the present disclosure comprises the thermal initiator in addition to the photoinitiator. Therefore, The covering material of the first aspect of the present disclosure allows promotion of crosslinking inside the covering material, for example, even when the covering material is thick or colored.

A third aspect of the present disclosure provides a method of manufacturing a cable. The method comprises: covering a core with a covering material; and crosslinking the covering material, wherein the covering material comprises: a resin component that comprises at least one of a crosslinkable resin having photo crosslinkability and thermal crosslinkability and a crosslinkable monomer having photo crosslinkability and thermal crosslinkability; a photoinitiator; and a thermal initiator.

In the method of manufacturing a cable of the third aspect of the present disclosure, the covering material comprises the photoinitiator in addition to the thermal initiator. Therefore, in the method of manufacturing a cable of the third aspect of the present disclosure, the blending amount of the thermal initiator can be reduced compared to the case where only the thermal initiator is contained as an initiator. As a result, according to the present disclosure, it is possible to inhibit premature crosslinking of the covering material.

In the method of manufacturing a cable of the third aspect of the present disclosure, the covering material comprises the thermal initiator in addition to the photoinitiator. Therefore, in the method of manufacturing a cable of the third aspect of the present disclosure, crosslinking inside the covering material can be promoted, for example, even when the covering material is thick or colored.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Hereinafter, an embodiment of the present disclosure will be explained.

1. COVERING MATERIAL (1-1) Resin

A covering material of the present disclosure comprises a resin component. The resin component comprises at least one of a crosslinkable resin having photo crosslinkability and thermal crosslinkability and a crosslinkable monomer having photo crosslinkability and thermal crosslinkability. The resin component may comprise a resin as a main component (a main component resin) and the crosslinkable monomer. The main component resin may comprise the crosslinkable resin and optionally a non-crosslinkable resin.

Examples of the non-crosslinkable resin to be used may include a polyolefin-based resin, a rubber-based resin, and other resins. Examples of the polyolefin-based resin to be used may include polypropylene, high density polyethylene, linear low density polyethylene (LLDPE), low-density polyethylene, ultralow density polyethylene, ethylene-butene-1 copolymer, ethylene-hexene-1 copolymer, ethylene-octene-1 copolymer, ethylene-vinyl acetate copolymer (EVA), ethylene-ethyl acrylate copolymer, polybutene, poly-4-methyl-pentene-1, ethylene-butene-hexene terpolymer, ethylene-methyl methacrylate copolymer, ethylene-methyl acrylate copolymer, and ethylene-glycidyl methacrylate copolymer (EGMA).

Examples of the rubber-based resin to be used may include styrene-diene copolymer, styrene-diene-styrene copolymer, and styrene-based rubber. Examples of the styrene-diene copolymer to be used may include ethylene-propylene-diene copolymer, ethylene-propylene copolymer, ethylene-butene-1-diene copolymer, ethylene-octene-1-diene copolymer, acrylonitrile butadiene rubber, acrylic rubber, styrene-butadiene rubber, and styrene isoprene rubber.

Examples of the styrene-diene-styrene copolymer to be used may include styrene-butadiene-styrene rubber and styrene-isoprene-styrene rubber.

The styrene-based rubber can be obtained, for example, by the hydrogenation of styrene-diene copolymer or styrene-diene-styrene copolymer.

Examples of other resins to be used may include polyvinyl chloride, polyvinylidene chloride, polystyrene, polyvinyl acetate, ABS resin (acrylonitrile butadiene styrene resin), AS resin (acrylonitrile styrene resin), acrylic resin, polyamide, nylon, polyacetal, polycarbonate, modified-polyphenyleneether, polybutylene terephthalate, polyethylene terephthalate, cyclic polyolefin, polyphenylene sulfide, polysulfone, polyethersulfone, polyether ether ketone, thermoplastic polyimide, polyamideimide, and fluororesin. The non-crosslinkable resin may be obtained by blending two or more types selected from the above-described resins.

EVA, LLDPE, and EGMA are preferably used as the non-crosslinkable resin.

The crosslinkable resin is obtained by introducing a reactive functional group into a molecular terminal, a branched chain, or a main chain of a resin to promote crosslinking by radicals or cations or anions and modifying it. The resin into which the reactive functional group is introduced is appropriately selected from, for example, the aforementioned non-crosslinkable resins.

Examples of the functional group to be introduced may include an acrylic group, a methacrylic group, a vinyl group, a vinyl ether group, an oxetane group, an epoxy group, an alicyclic epoxy group, an amino group, maleic acid, and maleic anhydride.

Examples of the crosslinkable resin to be used may include: a polyolefin-based resin having at least one functional group selected from the group consisting of an acrylic group, a methacrylic group, a vinyl group, a vinyl ether group, an oxetane group, an epoxy group, an alicyclic epoxy group, an amino group, maleic acid and maleic anhydride; and a rubber-based resin having at least one functional group selected from the group consisting of an acrylic group, a methacrylic group, a vinyl group, a vinyl ether group, an oxetane group, an epoxy group, an alicyclic epoxy group, an amino group, maleic acid, and maleic anhydride.

The crosslinkable resin is further preferably polyolefin into which maleic acid is introduced (for example, maleic acid modified polyolefin), and preferably polyethylene into which maleic acid is introduced (for example, maleic acid modified polyethylene).

The crosslinkable resin preferably occupies 5% by mass or more of a total mass of the resin component. This configuration gives high crosslinkability to the covering material.

A crosslinkable monomer functions as a crosslinking aid. The crosslinkable monomer has a functional group that generates a crosslinking reaction or a polymerization reaction by radicals or cations or anions. Examples of the functional group that generates the crosslinking reaction or the polymerization reaction by radicals or cations or anions may include at least one selected from the group consisting of an acrylic group, a methacrylic group, a vinyl group, a vinyl ether group, an oxetane group, an epoxy group, an alicyclic epoxy group, an amino group, maleic acid, and maleic anhydride.

The crosslinkable monomer may be a monofunctional monomer or a polyfunctional monomer. One type of such crosslinkable monomer may be used alone, or two or more types thereof may be used in combination.

Examples of the crosslinkable monomer to be used may include a monomer having an acrylic group (acrylate monomer), a monomer having a methacrylic group (methacrylate), and a monomer having a vinyl group or a vinyl ether group.

Examples of the monomer having an acrylic group to be used may include a monofunctional monomer, a bifunctional monomer, and a tri- or more-functional monomer. Examples of the monofunctional monomer to be used may include isobornyl acrylate and ethoxylated phenyl acrylate. Examples of the bifunctional monomer to be used may include dipropylene glycol diacrylate, 1,6-hexanediol diacrylate, and tripropylene glycol diacrylate. Examples of the tri- or more-functional monomer to be used may include TMPTA (trimethylolpropane triacrylate), glycerin propoxy triacrylate, and ditrimethylolpropane tetramethacrylate.

Examples of the monomer having a methacrylic group to be used may include a monofunctional monomer, a bifunctional monomer, and a tri- or more-functional monomer. Examples of the monofunctional monomer to be used may include isobornyl methacrylate and ethoxylated phenyl methacrylate. Examples of the bifunctional monomer to be used may include dipropylene glycol dimethacrylate, 1,6-hexanediol dimethacrylate, and tripropylene glycol dimethacrylate. Examples of the tri- or more-functional monomers to be used may include TMPTMA (trimethylol propane trimethacrylate), glycerin propoxy trimethacrylate, and ditrimethylolpropane tetramethacrylate.

Examples of the monomer having the vinyl group or the vinyl ether group to be used may include a vinyl acetate monomer, butyl vinyl ether, vinyl butyrate monomer, cyclohexyl vinyl ether and 2-methyl-1-vinylimidazole.

The addition amount of the crosslinkable monomer can be determined in accordance with the properties of a desired resin component. The addition amount of the crosslinkable monomer is preferably 1 to 50 parts by mass, and more preferably, 1 to 30 parts by mass relative to 100 parts by mass of components excluding the crosslinking monomer from the resin component. When the addition amount of the crosslinkable monomer is 1 part by mass or more, the covering material has improved crosslinkability. When the addition amount of the crosslinking monomer is 50 parts by mass or less, the covering material has a great elongation, and the covering material becomes less fragile. When the addition amount of the crosslinking monomer is 30 parts by mass or less, the covering material has a greater elongation, and the covering material becomes much less fragile.

When the main component resin contains only the non-crosslinkable resin, the covering material contains the crosslinkable monomer. Even when the main component resin contains the crosslinkable resin, it is preferable that the covering material contains the crosslinkable monomer.

(1-2) Photoinitiator

The covering material of the present disclosure comprises a photoinitiator. Photoinitiators generate a radical or a cation or an anion by light and promote photo-crosslinking. Examples of light to be used may include ultraviolet radiation and electron beam. Photoinitiators serve as a trigger for the crosslinking reaction. Examples of the photoinitiator to be used may include a photo-radical initiator and a photo-cationic initiator. These may each be used alone or in combination as the photoinitiator.

The addition amount of the photoinitiator may be determined in accordance with the properties of a target resin component. The addition amount of the photoinitiator is preferably 0.1 to 15 parts by mass relative to 100 parts by mass of the resin component. When the addition amount of the photoinitiator is 0.1 parts by mass or more, the covering material has improved crosslinkability. When the addition amount of the photoinitiator is 15 parts by mass or less, the covering material has a greater elongation, and the covering material becomes less fragile.

Examples of the photo-radical initiator to be used may include acetophenone, 4,4'-dimethoxybenzyl, diphenylethanedione, 2-hydroxy-2-phenylacetophenone, diphenyl ketone, benzophenone-2-carboxylic acid, 4,4'-bis(diethylamino)benzophenone, 4,4'-bis(dimethylamino)benzophenone, benzoin methyl ether, benzoin iso-propyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, 2-methyl benzoylbenzoate, 2-(1,3-benzodioxole-5-yl)-4,6-bis(trichloromethyl)-1,3,5-triazine, 2-benzil-2-(dimethylamino)-4'-morpholino butyrophenone, 2,3-bornandion, 2-chlorothioxanthone, 4-chlorobenzophenone, 4,4'-dichlorobenzophenone, 1,2-alkyl benzophenone, 2,2-diethoxyacetophenone, 2,2-dimethoxy-2-phenylacetophenone, 2,4-diethyl thioxanthene-9-one, diphenyl(2,4,6-trimethylbenzoyl)phosphine oxide, 1,4-dibenzoyl benzene, 2-ethyl anthraquinone, 1-hydroxycyclohexyl phenyl ketone, 2-hydroxy-2-methylpropiophenone, 2-hydroxy-4'-(2-hydroxyethoxy)-2-methylpropiophenone, phenyl(2,4,6-trimethylbenzoyl)lithium phosphinate, 2-methyl-4'-(methylthio)-2-morpholino propiophenone, 2-isonitrosopropiophenone, 2-phenyl-2-(p-toluenesulfonyloxy)acetophenone, and phenylbis(2,4,6-trimethylbenzoyl) phosphine oxide.

One type of such photo-radical initiator described above may be used alone, or two or more types thereof may be used in combination.

Examples of the photo-cationic initiator to be used may include 4,4'-dimethyl diphenyl iodonium phosphate, hexafluorophosphoric acid 3 arylthionium salt, bis(4-tert-butylphenyl)iodonium hexafluorophosphate, bis(4-fluorophenyl)iodonium trifluoromethanesulfonate, benzil(4-hydroxyphenyl)methylsulfonium hexafluoroantimonate, cyclopropyldiphenylsulfonium tetrafluoroborate, tetrafluoro boric acid dimethylphenacylsulfonium, diphenyliodonium hexafluorophosphate, diphenyliodonium hexafluoroarsenate, diphenyliodonium trifluoromethane sulfonic acid, 2-(3,4-dimethoxystyryl)-4,6-bis(trichloromethyl)-1,3,5-triazine, 2-[2-(furan-2-yl)vinyl]-4,6-bis(trichloromethyl)-1,3,5-triazine, 4-isopropyl-4'-methyldiphenyl iodonium tetrakis(pentafluorophenyl)borate, 2-[2-(5-methylfuran-2-yl)vinyl]-4,6-bis(trichloromethyl)-1,3,5-triazine, 2-(4-methoxyphenyl)-4,6-bis(trichloromethyl)-1,3,5-triazine, 2-(4-methoxy styryl)-4,6-bis(trichloromethyl)-1,3,5-triazine, (2-methylphenyl)(2,4,6-trimethylphenyl)iodonium trifluoromethanesulfonate, (3-methylphenyl)(2,4,6-trimethylphenyl)iodonium trifluoromethanesulfonate, (4-methylphenyl)(2,4,6-trimethylphenyl)iodonium trifluoromethanesulfonate, 4-nitrobenzene diazonium tetrafluoro borate, (4-nitrophenyl)(phenyl)iodonium trifluoromethanesulfonate, triphenylsulfonium tetrafluoroborate, triphenylsulfonium bromide, tri-p-tolylsulfonium hexafluorophosphate, tri-p-tolylsulfonium trifluoromethanesulfonate, [3-(trifluoromethyl)phenyl](2,4,6-trimethylphenyl)iodonium trifluoromethanesulfonate, [4-(trifluoromethyl)phenyl](2,4,6-trimethylphenyl)iodonium trifluoromethanesulfonate, [bis[4-n-alkyl(C10 to C13)phenyl]iodonium hexafluoroantimonate], tetrakis pentafluorophenyl borate, iodonium, (4-methylphenyl) [4-(2-methylpropyl)phenyl]-hexafluorophosphate(1−), triarylsulfonium hexafluorophosphate, and triarylsulfonium tetrakis-(pentafluorophenyl)borate. One type of such photo-cationic initiator described above may be used alone, or two or more types thereof may be used in combination.

(1-3) Thermal Initiator

The covering material of the present disclosure comprises a thermal initiator. Thermal initiators generate a radical or a cation or an anion by heat and promotes thermal crosslinking. Thermal initiators serve as a trigger for the crosslinking reaction. Examples of the thermal initiator to be used may include a thermal radical initiator and a thermal cationic initiator. These may each be used alone or in combination as the thermal initiator.

The addition amount of the thermal initiator may be determined in accordance with the properties of a target resin component. The addition amount of the thermal initiator is preferably 0.1 to 15 parts by mass relative to 100 parts by mass of the resin component. When the addition amount of the thermal initiator is 0.1 parts by mass or more, the covering material has improved crosslinkability. When the addition amount of the thermal initiator is 15 parts by mass or less, the covering material has a greater elongation, and the covering material becomes less fragile.

Examples of the thermal radical initiator to be used may include azo compounds, ketone peroxides, diacyl peroxides, hydroperoxides, dialkyl peroxides, peroxyketals, alkyl peresters, and percarbonates.

Specific examples of the thermal radical initiator to be used may include 2,2'-azobis(isobutyronitrile), 2,2'-azobis(2,4-dimethylvaleronitrile), 2,2'-azobis(2-methylbutyronitrile), 4,4'-azobis(4-cyanovaleric acid), 2,2'-azobis(2-methyl propionamidine)dihydrochloride, 2,2'-azobis[2-(2-imidazoline-2-yl)propane]dihydrochloride, benzoyl peroxide, tert-butylhydroperoxide, cumene hydroperoxide, di-tert-butyl peroxide, 2,2'-azobis(2-methylpropionic acid)dimethyl, and dicumylperoxide. One type of such thermal radical initiator described above may be used alone, or two or more types thereof may be used in combination.

Examples of the thermal cationic initiator to be used may include dicyandiamide, p-toluenesulfonic acid cyclohexyl, and diphenyl (methyl)sulfonium tetrafluoroborate. One type of such thermal cationic initiator described above may be used alone, or two or more types thereof may be used in combination.

If the blending quantity of the thermal initiator is increased, premature crosslinking tends to occur because radicals are generated by heat in an extruder and crosslinking proceeds too rapidly. Since the covering material of the present disclosure comprises the photoinitiator in addition to the thermal initiator, the blending quantity of the thermal initiator can be reduced as compared with the case where only the thermal initiator is included as an initiator. Consequently, it is possible to inhibit premature crosslinking and shorten the time required for crosslinking without increasing the blending quantity of the thermal initiator.

Photoinitiators, which are insensitive to heat, do not induce crosslinking until being exposed to photoradiation after an extrusion. Therefore, even if the photoinitiator is blended, premature crosslinking is unlikely to occur.

When the covering material is thick or colored, light is unlikely to reach inside the covering material. Therefore, in the case where only the photoinitiator is blended as an initiator, crosslinking may be insufficient inside the covering material. Since the covering material of the present disclosure comprises the thermal initiator in addition to the photoinitiator, crosslinking inside the covering material can be generated sufficiently even when the covering material is thick or colored.

(1-4) Additive

The covering material of the present disclosure may include various additives. Additives impart specific functions to the covering material, for example.

Examples of additives to be used may include a flame retardant, and examples of flame retardants to be used may include metallic hydroxide. Examples of metallic hydroxide to be used may include magnesium hydroxide, aluminum hydroxide, and calcium hydroxide. Among the flame retardants, magnesium hydroxide with high flame retardant effect is preferable. The metallic hydroxide is preferably surface treated from the view point of dispersibility.

Examples of surface treatment agents to be used for surface treatment of metallic hydroxide may include a silane-based coupling agent, a titanate coupling agent, fatty acid, and fatty acid metal salt. Among the surface treatment agents, the silane-based coupling agent is preferable from the view point of enhancing adhesion between resin component and metallic hydroxide.

Examples of the silane-based coupling agent to be used may include: a vinylsilane compound such as vinyltrimethoxysilane, vinyl triethoxysilane, and vinnithoris(β-methoxyethoxy)silane; an amino silane compound such as γ-aminopropyltrimethoxysilane, γ-aminopropyltriethoxysilane, N-β-(aminoethyl)γ-aminopropyltrimethoxysilane, β-(aminoethyl) γ-aminopropylmethyldimethoxysilane, and N-phenyl-γ-aminopropyltrimethoxysilane; an epoxysilane compound such as β-(3,4 epoxy cyclohexyl)ethyltrimethoxysilane, γ-glycidoxypropyltrimethoxysilane, and γ-glycidoxypropylmethyldiethoxysilane; an acrylic silane compound such as γ-methacryloxypropyl trimethoxy silane; a polysulfide silane compound such as bis(3-(triethoxysilyl)propyl)disulfide and bis(3-(triethoxysilyl)propyl)tetrasulfide; and a mercaptosilane compound such as 3-mercaptopropyltrimethoxysilane and 3-mercaptopropyltriethoxysilane.

Examples of additives to be used may include an ultraviolet absorber. The ultraviolet absorber may be of any type that serves the purpose of use. Examples of the ultraviolet absorber to be used may include a salicylate derivative. Examples of the salicylate derivative to be used may include phenyl salicylate and p-tert-butyl phenyl salicylate.

Examples of the ultraviolet absorber to be used may include a benzophenone-based ultraviolet absorber. Examples of the benzophenone-based ultraviolet absorber to be used may include 2,4-dihydroxybenzophenone, 2-hydroxy-4-methoxybenzophenone, 2,2'-dihydroxy-4-methoxybenzophenone, 2,2'dihydroxy-4,4'-dimethoxybenzophenone, 2-hydroxy-4-n-octoxybenzophenone, 2,2',4,4'-tetrahydroxy benzophenone, 4-dodecyloxyl-2-hydroxybenzophenone, 3,5-di-tert-butyl-4-hydroxybenzoyl acid, n-hexadecyl ester, bis(5-benzoyl-4-hydroxy-2-methoxyphenyl)methane, 1,4-bis(4-benzoyl-3-hydroxyphenoxy)butane, and 1,6-bis(4-benzoyl-3-hydroxyphenoxy) hexane.

Examples of the ultraviolet absorber to be used may include a benzotriazole-based ultraviolet absorber. Examples of the benzotriazole-based ultraviolet absorber to be used may include 2-(2'-hydroxy-5'-methyl-phenyl)benzotriazole, 2-(2'-hydroxy-3',5'-di-tert-butyl-phenyl)benzotriazole, 2-(2'-hydroxy-3'-di-tert-butyl-5'-methyl-phenyl)-5-chlorobenzotriazole, 2-(2'-hydroxy-3',5'-di-tert-butyl-phenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2,2'-methylenebis [4-(1,1,3,3-tetramethylbutyl)-6-(2H-benzotriazole-2-yl)phenol], and 2-[2-hydroxy-3,5-bis(α,α-dimethylbenzyl)phenyl]-2H-benzotriazole.

Other examples of ultraviolet absorbers to be used may include a benzotriazole derivative, an oxalic anilide derivative, and 2-ethyl-hexyl-2-cyano-3,3-diphenyl acrylate.

One type of such ultraviolet absorber described above may be used alone, or two or more types thereof may be used in combination.

Examples of additives to be used may include a light stabilizer. The light stabilizer is not particularly limited. Examples of the light stabilizer to be used may include a hindered amine-based light stabilizer. Examples of the light stabilizer to be used may include poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]], poly[(6-morpholino-s-triazine-2,4-diyl) [2,2,6,6-tetramethyl-4-piperidyl]imino]-hexamethylene[(2,2,6,6-tetramethyl-4-piperidyl)imino]], N,N'-bis(3-aminopropyl)ethylene diamine •2,4-bis[N-butyl-N-(1,2,2,6,6-pentamethyl-4-piperidyl)amino]-6-chloro-1,3,5-triazine condensate, and dibutyl amine •1,3,5-triazine •N,N'-bis(2,2,6,6-tetramethyl-4-piperidyl-1,6-hexamethylenediamine •N-(2,2,6,6-tetramethyl-4-piperidyl)butylamine polycondenstate. One type of such light stabilizer described above may be used alone, or two or more types thereof may be used in combination.

Examples of additives to be used may include a process oil, a processing aid, a flame retardant, a flame retardant aid, an antioxidant, a lubricant, an inorganic filler, a compatibilizing agent, a stabilizer, a carbon black, and a coloring agent.

2. CABLE

A cable according to the present disclosure comprises a core and a covering material. The covering material covers the core. The covering material is explained in the section of "1. Covering Material" above.

The core is a metal conductor, or a metal conductor with a covering. Examples of the cable to be used may include an electrical wire, a cable using single or multiple optical fibers, and a composite wire of a metal conductor and an optical fiber cable.

3. METHOD OF MANUFACTURING CABLE

In a method of manufacturing a cable according to the present disclosure, a core is covered with a covering material, and the covering material is cross-linked. The covering material is explained in the section of "1. Covering Material" above.

Figure 1:
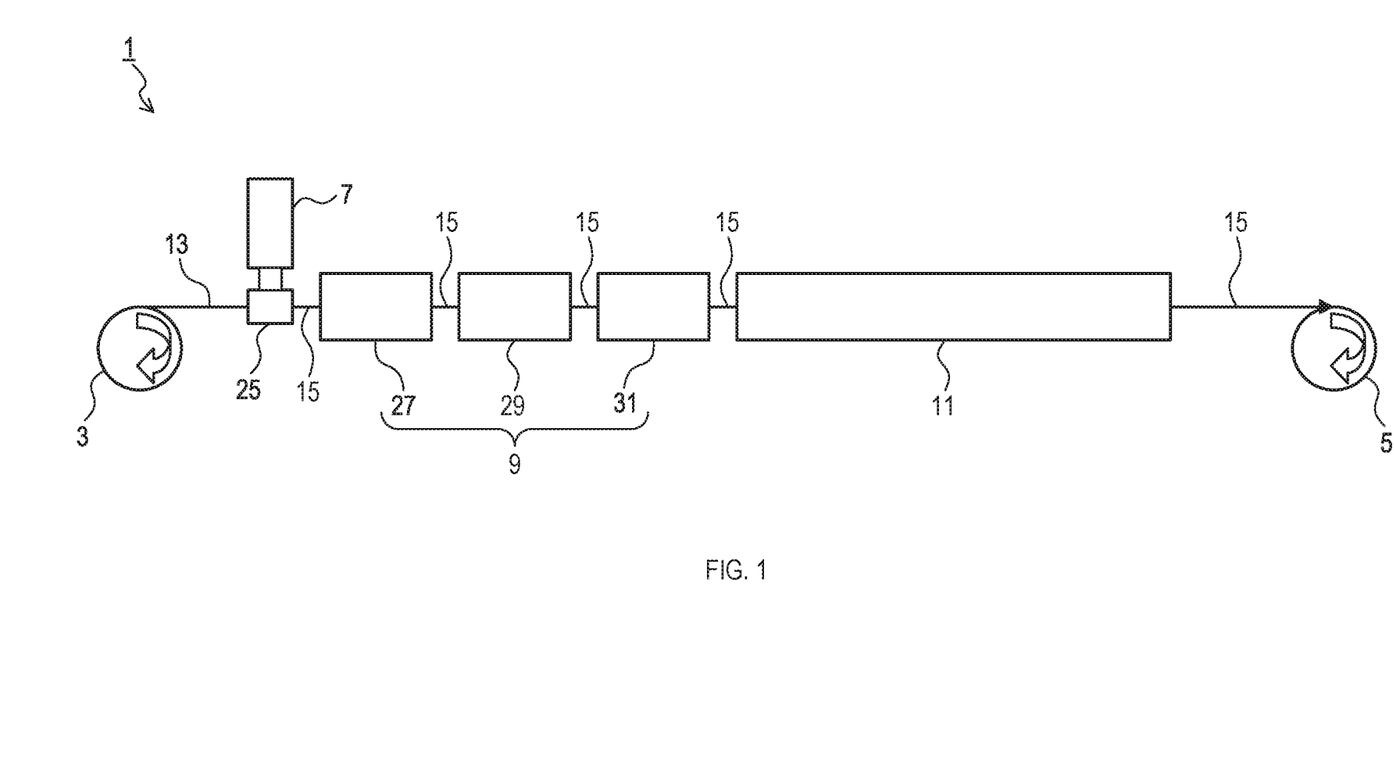
FIG. 1 is an explanatory diagram showing a configuration of a manufacturing line.
Figure 2:
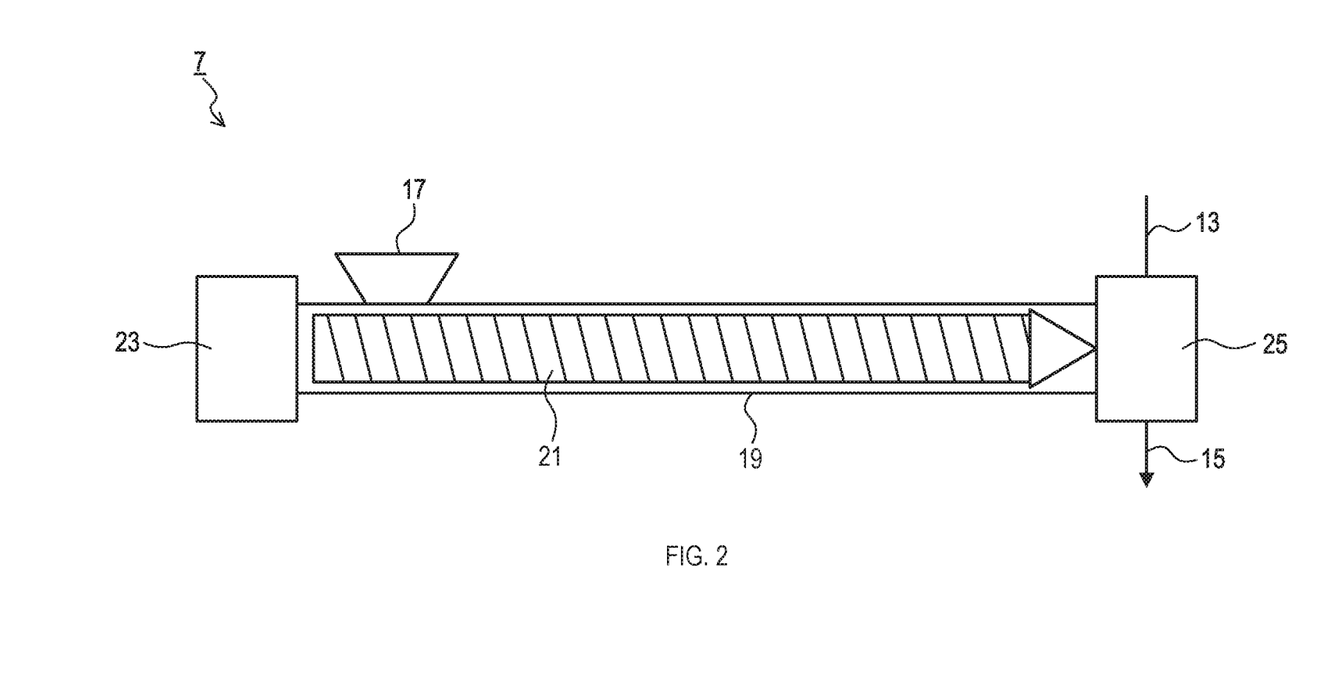
FIG. 2 is an explanatory diagram showing a configuration of a resin molding device.

The method of manufacturing a cable according to the present disclosure may be achieved using, for example, a manufacturing line 1 shown in FIG. 1 and FIG. 2.

The manufacturing line 1 includes a feeder 3, a winding machine 5, a resin molding machine 7, a crosslinking apparatus 9, and a cooler 11.

The feeder 3 supplies a core 13. The supplied core 13 reaches a forming head 25 to be described below. The winding machine 5 stores a manufactured cable 15 as described below.

The resin molding machine 7 is an extruder. FIG. 2 shows a configuration of the resin molding machine 7. The resin molding machine 7 includes a charging portion 17, a cylinder 19, a screw 21, a drive unit 23, and the forming head 25.

The covering material is introduced into the charging portion 17. At this time, for example, each component of the covering material may be separately introduced into the charging portion 17. Alternatively, for example, components of the covering material may be previously kneaded and pelletized by a mixer, a blender, a roll and the like, and the resulting pellets may be introduced into the charging portion 17.

The screw 21 is provided in the cylinder 19. The screw 21 is rotated by a driving force transmitted by the drive unit 23. The covering material introduced into the charging portion 17 moves inside the cylinder 19 while being subjected to melting and kneading by the screw 21, and reaches the forming head 25. The forming head 25 extrudes the covering material. The extruded covering material covers the core 13. Consequently, the cable 15 is manufactured.

The crosslinking apparatus 9 is provided on a path where the cable 15 is conveyed to the winding machine 5. The crosslinking apparatus 9 comprises a first light emitter 27, a second light emitter 29, and a heater 31. These components are arranged in the order of the first light emitter 27, the second light emitter 29, and the heater 31 from upstream to downstream in a conveying direction of the cable 15.

The first light emitter 27 and the second light emitter 29 emit light to the cable 15. The light may be, for example, ultraviolet radiation. By the emitted light, photo-crosslinking of the at least one of the crosslinkable resin and the crosslinkable monomer proceeds in the covering material.

The first light emitter 27 and the second light emitter 29 may each be an LED type or a discharge tube type. The discharge tube may be a non-electrode type or an electrode type. Examples of the discharge tube to be used may include a discharge tube in which an emission wavelength is adjusted by enclosing a specific element between electrodes. Peak wavelengths of lights emitted from the first light emitter 27 and the second light emitter 29 are preferably wavelengths suitable for absorption wavelengths of photoinitiators.

The number of light emitters is not limited to two. When the covering material contains two or more types of photoinitiators having different absorption wavelengths, separate light emitters may be provided for respective absorption wavelengths.

The heater 31 heats the cable 15. By the heating, thermal crosslinking of the at least one of the crosslinkable resin and the crosslinkable monomer proceeds in the covering material. The heater 31 may be any device that provides sufficient amount of heat to the thermal initiator contained in the covering material. Examples of heat sources to be used for the heater 31 may include an electrical heater, a microwave heating, a hot air heater, an infrared heater, water vapor, and superheated steam. One type of the above-described heat sources of the heater 31 may be used alone, or two or more types thereof may be used in combination.

When the first light emitter 27 and the second light emitter 29 give sufficient amount of heat required for thermal crosslinking to the cable 15, the heater 31 may be omitted.

The cooler 11 is provided on the path where the cable 15 is conveyed to the winding machine 5, and the cooler 11 is provided on the downstream side of the crosslinking apparatus 9. The cooler 11 cools the cable 15. The cooler 11 may be an air-cooling type or a water-cooling type. The cable 15 cooled by the cooler 11 is stored in the winding machine 5. The cooler 11 may be omitted as long as the cable can be manufactured without any problems.

4. EXAMPLES (4-1) Production of Covering Material

The covering materials for Examples 1 to 5, and Comparative Examples 1 to 3 were prepared. The covering materials included components shown in Table 1. "E1", "E2", "E3", "E4" and "E5" in Table 1 mean "Example 1", "Example 2", "Example 3", "Example 4" and "Example 5", respectively. "C1" "C2" and "C3" in Table 1 mean "Comparative Example 1", "Comparative Example 2" and "Comparative Example 3", respectively.

TABLE 1

| | | E1 | E2 | E3 | C1 | C2 | E4 | E5 | C3 |
|---|---|---|---|---|---|---|---|---|---|
| Resin component | EVA (VA amount 18%) | 80 | 80 | 80 | 80 | 80 | | | |
| | LLDPE | | | | | | 80 | 80 | 80 |
| | EGMA(ethylene-glycidyl methacrylate copolymer) | 10 | 10 | 10 | 10 | 10 | 5 | 5 | 5 |
| | Maleic acid modified PE | 10 | 10 | 10 | 10 | 10 | 15 | 15 | 15 |
| Photo-radical initiator | 4-chlorobenzophenone | 0.5 | 0.5 | 0.5 | 0.5 | | | | |
| | 1,2-alkyl benzophenone | | | | | | 1.5 | 1.5 | 1.5 |
| Photo-cationic initiator | 4,4'-dimethyl diphenyl iodonium phosphate | 2.5 | 2.5 | 2.5 | 2.5 | | | | |
| | Hexafluorophosphoric acid 3 arylthionium salt | | | | | | 2 | 2 | 2 |
| Thermal radical | 2,2'-azobis(isobutyronitrile) | 1 | 2 | | | | | 2 | |

TABLE 1-continued

|  |  | E1 | E2 | E3 | C1 | C2 | E4 | E5 | C3 |
|---|---|---|---|---|---|---|---|---|---|
| initiator |  |  |  |  |  |  |  |  |  |
| Thermal cationic initiator | P-toluenesulfonic acid cyclohexyl | 1.5 |  | 3 |  | 3.5 | 3.5 |  |  |
| Crosslinking aid | TMPTA | 1.5 | 1.5 | 1.5 |  | 1.5 | 2.5 | 2.5 | 2.5 |
| Antioxidant | Composite antioxidant | 0.3 | 0.3 | 0.3 | 0.3 | 0.3 | 0.5 | 0.5 | 0.5 |
|  | Phosphorous-based antioxidant | 0.15 | 0.15 | 0.15 | 0.15 | 0.15 | 0.1 | 0.1 | 0.1 |
| Flame retardant | Magnesium hydroxide | 150 | 150 | 150 | 150 | 150 | 135 | 135 | 135 |
|  | Zinc borate | 2 | 2 | 2 | 2 | 2 | 4 | 4 | 4 |
| Lubricant | Hydroxy silicone oil | 3 | 3 | 3 | 3 | 3 | 3 | 3 | 3 |
| Coloring agent | Carbon #60 | 3 | 3 | 3 | 3 | 3 | 3 | 3 | 3 |

Table 1 shows the blending quantity in parts by mass. When manufacturing each covering material, all the components except the thermal radical initiator, the thermal cationic initiator, and the lubricant were first kneaded together by a kneader and then pelletized by a granulator. The thermal radical initiator and the thermal cationic initiator were dispersed in a dispersion medium consisting of the lubricant to obtain dispersion liquid. Finally, the pellets and the dispersion liquid were mixed to obtain each covering material.

(4-2) Production of Cable

The cables 15 were manufactured by using the covering materials of respective Examples and Comparative Examples prepared in (4-1) above and the above-described manufacturing line 1. The covering materials of respective Examples and Comparative Examples were moldable by extrusion.

The core 13 was a single wire made of copper having a diameter of 0.8 mm. The specific configuration of the manufacturing line 1 was as follows.

The resin molding machine 7 was a single axis extruder. The cylinder 19 had an inner diameter of 40 mm. The screw 21 was a full flight screw having an L/D ratio of 29. L is the length in an axial direction of the screw 21, and D is the outer diameter of the screw 21. The temperature of the cylinder 19 was 170° C. The cable length manufactured by one minute was 30 m.

Each of the first light emitter 27 and the second light emitter 29 was an ultraviolet emitter. Each of the first light emitter 27 and the second light emitter 29 was provided with high pressure metal halide lamps manufactured by ORC MANUFACTURING CO., LTD. The first light emitter 27 was provided with two SMX series 4 kW lamps. The second light emitter 29 was provided with two MXA series 4 kW lamps. The heater 31 was an electric furnace having a furnace length of 1 m. A preset temperature of the heater 31 was 220° C.

The obtained cable included the core and the covering material covering the core. The core was a single wire made of copper having the diameter of 0.8 mm, and the covering material served as a covering that covers a surface of the core with a thickness of 1 mm.

(4-3) Measurement of Gel Fraction

For each of Examples and Comparative Examples, gel fraction of the covering material was measured. The gel fraction is an index for evaluating a degree of crosslinking of the covering material. The measurement method of the gel fraction was as follows. A specimen of 0.5 g was cut out from the covering material of the cable 15. The specimen was suspended in xylene at 110° C. for 24 hours. After that, the specimen was taken out from xylene and subjected to a vacuum drying at 80° C. for 4 hours. After that, the mass w (g) of the specimen was measured. The gel fraction X was calculated by the following equation (1).

$$X = (w/0.5) \times 100 \tag{1}$$

Table 2 shows measurement results of the gel fraction.

TABLE 2

| Items | Evaluation Details | E1 | E2 | E3 | C1 | C2 | E4 | E5 | C3 |
|---|---|---|---|---|---|---|---|---|---|
| Gel fraction | Residual rate after drying (%) | 78.5 | 72.8 | 73.6 | 32.4 | 60.4 | 68.8 | 63.6 | 28.8 |
| Hot set test | Elongation under load (%) | 68 | 75 | 70 | melted | 90 | 80 | 85 | melted |
|  | Elongation after cooling (%) | 7 | 10 | 10 | x | 45 | 15 | 15 | x |

In each of Examples 1 to 5, gel fraction was high. That means it was confirmed that the degree of crosslinking was high both on the surface and inside the covering material in each of Examples 1 to 5. In contrast, in each of Comparative Examples 1 to 3, gel fraction was low. Especially, Comparative Examples 1 and 3 showed low gel fractions.

The reason that the gel fraction was low in each of covering materials of Comparative Examples 1 and 3 may be assumed as follows: The covering materials of Comparative Examples 1 and 3 did not include any thermal initiator. Therefore, crosslinking was insufficient inside the covering materials, and this resulted in the low gel fractions.

(4-4) Hot Set Test

A hot set test was conducted for each of Examples 1 to 5 and Comparative Examples 1 to 3. The hot set test is a test to evaluate a mechanical heat resistance of the covering materials. The hot set test was conducted in accordance with JIS C 3660-2-1. Each specimen was the covering material separated from the core 13. Specific test conditions were as follows.

Temperature: 200° C.
Load: 20 N/cm²
Loading time: 15 minutes

When elongation under load was 100% or less and permanent elongation after cooling was 25% or less, the specimen was rated as passed, and others were rated as failed. Table 2 above shows the evaluation results.

Examples 1 to 5 were rated as passed. Therefore, it was confirmed that the degree of crosslinking was high both on the surface and inside the covering material in all of Examples 1 to 5. In contrast, Comparative Examples 1 to 3 were rated as failed.

The reason that the covering materials of Comparative Examples 1 and 3 were rated as failed may be assumed as follows: The covering materials of Comparative Examples 1 and 3 did not include any thermal initiator. Therefore, crosslinking was insufficient inside the covering materials, and this resulted in the evaluations of failed. The reason that the covering material of Comparative Example 2 was rated as failed may be assumed as follows: The covering material of Comparative Example 2 did not include any photoinitiator. Therefore, crosslinking on the surface of the covering material was insufficient, and this resulted in the evaluation of failed.

In each of Examples 1 to 5, a sufficient degree of crosslinking for practical use was achieved at a manufacturing speed of 30 m/min.

5. OTHER EMBODIMENTS

Although the embodiment of the present disclosure has been described above, the present disclosure may be achieved in various modifications without being limited to the explained embodiment.

(1) In the aforementioned embodiment, one function of one element may be achieved by two or more elements; or two or more functions of two or more elements may be achieved by one element. A part of the configuration of the aforementioned embodiment may be omitted; and at least a part of the configuration of the aforementioned embodiment may be added to or replaced with another configuration. It should be noted that any and all modes encompassed in the technical ideas that are defined by the languages in the claims are embodiments of the present disclosure.

(2) In addition to the aforementioned covering material, cable, and manufacturing method of a cable, the present disclosure may also be achieved in various forms, such as a system using the cable as a component and a method of manufacturing the covering material.

What is claimed is:

1. A cable covering material obtained from:
    a resin component that comprises at least one of a crosslinkable resin having photo crosslinkability and thermal crosslinkability and a crosslinkable monomer having photo crosslinkability and thermal crosslinkability;
    a photoinitiator, comprising a photo radical initiator and a photo cationic initiator, wherein the amount of the photoinitiator is 0.1 to 3.5 parts to 100 parts by mass of the resin component; and
    a thermal initiator, comprising a thermal radical initiator and/or a thermal cationic initiator,
    wherein a gel fraction of the cable covering material obtained from the resin is from 63.6-78.5%.

2. The cable covering material according to claim 1, wherein the cable covering material is moldable by extrusion.

3. The cable covering material according to claim 1, wherein the resin component comprises the crosslinkable resin having at least one selected from the group consisting of an acrylic group, a methacrylic group, a vinyl group, a vinyl ether group, an oxetane group, an epoxy group, an alicyclic epoxy group, an amino group, maleic acid, and maleic anhydride, and
    wherein the crosslinkable resin occupies 5% by mass or more of a total mass of the resin component.

4. The cable covering material according to claim 3, wherein, the crosslinkable resin comprises at least one selected from the group consisting of:
    a polyolefin-based resin having at least one functional group selected from the group consisting of an acrylic group, a methacrylic group, a vinyl group, a vinyl ether group, an oxetane group, an epoxy group, an alicyclic epoxy group, an amino group, maleic acid, and maleic anhydride; and
    a rubber-based resin having at least one functional group selected from the group consisting of an acrylic group, a methacrylic group, a vinyl group, a vinyl ether group, an oxetane group, an epoxy group, an alicyclic epoxy group, an amino group, maleic acid, and maleic anhydride.

5. The cable covering material according to claim 3, wherein the crosslinkable resin comprises maleic acid modified polyolefin.

6. The cable covering material according to claim 1, wherein the resin component comprises a crosslinkable monomer having at least one selected from the group consisting of an acrylic group, a methacrylic group, a vinyl group, a vinyl ether group, an oxetane group, an epoxy group, an alicyclic epoxy group, an amino group, maleic acid, and maleic anhydride.

7. The cable covering material according to claim 6, wherein the cable covering material comprises 1 to 30 parts by mass of the crosslinkable monomer to 100 parts by mass of components excluding the crosslinkable monomer from the resin component.

8. The cable covering material according to claim 1, wherein the resin component further comprises a non-crosslinkable resin.

9. The cable covering material according to claim 8, wherein the non-crosslinkable resin comprises at least one selected from the group consisting of a polyolefin-based resin and a rubber-based resin.

10. The cable covering material according to claim 8, wherein the non-crosslinkable resin comprises a linear low density polyethylene (LLDPE), an ethylene-vinyl acetate copolymer (EVA), and an ethylene-glycidyl methacrylate copolymer (EGMA).

11. A cable comprising:
    a core; and
    a cable covering material according to claim 1 that covers the core.

12. The cable covering material according to claim 1, wherein the elongation under load of the cable covering material obtained from the resin is 68% to 85% and permanent elongation after cooling is 7% to 15% in a heat resistance evaluation test in accordance with JIS C 3660-2-1, the heat resistance evaluation test being conducted under conditions of:
    Temperature: 200° C.,
    Load: 20 N/cm$^2$, and
    Loading time: 15 minutes.

* * * * *